(12) United States Patent
Lawson et al.

(10) Patent No.: US 6,203,708 B1
(45) Date of Patent: Mar. 20, 2001

(54) ION EXCHANGE RESIN

(75) Inventors: Frank Lawson, Glen Waverly; William Harold Jay, Doncaster, both of (AU)

(73) Assignee: Monash University, Clayton (AU)

(*) Notice: Subject to any disclaimer, the term of this patent is extended or adjusted under 35 U.S.C. 154(b) by 0 days.

(21) Appl. No.: 09/314,526

(22) Filed: May 17, 1999

Related U.S. Application Data

(62) Continuation of application No. 08/972,046, filed on Nov. 17, 1997, now abandoned, which is a continuation of application No. 08/351,321, filed as application No. PCT/AU93/00312 on Jun. 25, 1993, now abandoned.

(30) Foreign Application Priority Data

Jun. 25, 1992 (AT) .............................................. PL3151/92

(51) Int. Cl.[7] .............................. B01J 39/18; B01J 41/12; B01J 43/00; B01J 47/00; C02F 1/42
(52) U.S. Cl. ......................... 210/661; 210/675; 210/679; 210/688; 204/106; 521/28; 423/139; 423/24; 423/29; 75/110 R; 525/107; 525/128; 525/438; 525/440; 525/129; 525/100
(58) Field of Search ............................ 204/106; 210/688, 210/679, 675, 661; 521/28; 423/139, 24, 29; 75/101 R; 525/100, 107, 127, 128, 129, 438, 440

(56) References Cited

U.S. PATENT DOCUMENTS

| | | | |
|---|---|---|---|
| 3,920,545 | 11/1975 | Argabright et al. | 75/101 |
| 4,028,255 | 6/1977 | Bolto et al. | 210/500 |
| 4,039,485 | 8/1977 | Argabright et al. | 75/101 |
| 4,069,119 | 1/1978 | Wong | 204/106 |
| 4,134,831 | 1/1979 | Dawson et al. | 210/747 |
| 4,284,511 | 8/1981 | Weitzen et al. | 210/661 |
| 4,302,553 | 11/1981 | Frisch et al. | 525/28 |
| 4,342,839 | 8/1982 | Akiyama et al. | 521/25 |
| 4,622,344 | 11/1986 | Babcock et al. | 521/28 |
| 4,664,812 | 5/1987 | Klein | 210/679 |
| 4,702,838 | 10/1987 | Babcock et al. | 210/638 |
| 4,767,804 | 8/1988 | Willoughby | 523/351 |
| 4,876,287 | 10/1989 | Babcock et al. | 521/28 |

FOREIGN PATENT DOCUMENTS 0 045 823  2/1982 (EP) .

OTHER PUBLICATIONS

JP–B–47 013 001; Chemical Abstracts; Derwent Publications Ltd.; vol. 77; Nov. 27, 1972.

*Primary Examiner*—Chester T. Barry
(74) *Attorney, Agent, or Firm*—Foley & Lardner

(57) ABSTRACT

An ion exchange resin comprising an ion exchange material dispersed or distributed throughout a polyurethane matrix. The ion exchange material is typically a second polymer which has been chemically modified after dispersion or distribution throughout the polyurethane matrix.

35 Claims, No Drawings

ION EXCHANGE RESIN

This application is a continuation of application Ser. No. 08/972,046, filed Nov. 17, 1997, now abandoned, which in turn is a continuation of Ser. No. 08/351,321, filed Feb. 3, 1995, now abandoned which in a 371 of PCT/AU93/00312 filed Jun. 25, 1993.

This invention relates to ion exchange resins comprising an ion exchange material dispersed or distributed throughout a polyurethane matrix and methods of producing the same.

Various polymeric materials have been developed and shown to be useful in ion exchange or deionising systems for removing soluble electrolytes from an ionising solvent (typically aqueous solutions). Commercially available ion exchange resins are produced from polymers such as phenol-formaldehyde, styrene-divinyl benzene, acrylonitrile, acrylates and polyamines. These polymers may subsequently be modified, for example, by halomethylation, sulphonation, phosphorylation, carboxylation, etc. Further modification of the resin so produced may be achieved by a further chemical reaction to attach particular ligands to the benzene ring present in the resin or to the halomethyl, sulphonic acid, carboxylic acid, amide, amine, nitrile, or other reactive site. This further reaction enables the production of an ion exchange resin with specific reactive sites thereby exhibiting greater selectively towards particular metal ions or other anions or cations. In conventional practice, the ion exchange resins are produced in bead or granular form, the bead size generally varying from 40 microns to in excess of 1 mm in diameter.

Known ion exchange resins, suffer from a number of disadvantages however. To increase the available surface area of ion exchange resins which are produced in bead or granular form, the polymers may be produced in a macroporous form. It has been reported that these beads can suffer from osmotic shock, poor regeneration efficiencies, often lower sorption capacities and higher regeneration costs. In order to achieve a rapid removal of cations or anions from solution it is necessary to reduce the size of the beads to maximise the surface to volume ratio.

In a typical hydrometallurgical process, the ion exchange beads may be added to a clarified lixiviant, a process solution partly clarified by removal of the larger ore solids, or alternatively the ion exchange beads may be mixed with the ore solids in the form of a pulp, the granular ion exchange resin then being recovered by screening. Alternatively, the polymer may be manufactured containing a magnetic material, in which case, the ion-exchange beads may be recovered by magnetic separation. It has been suggested that particularly high values for absorption are obtained if the resins are finely ground. However, fine grinding of the ion exchange resin or the use of ion exchange resin beads of diameters similar to that of the ore pulp in which it is dispersed, make the resin difficult to recover by simple screening.

It has been proposed to disperse known ion exchange resins into a polyurethane polymer. It has been found, however, that a chemical reaction may occur between the liquid isocyanate compound of a polyurethane system and the reactive ligand present on the surface of the ion exchange bead. The catalysts used in the production of the polyurethane foam or the highly reactive isocyanate component can also react with the ligands on the ion exchange resin, destroying their ion exchange properties. Such a reaction may become one of a number of competing chemical reactions which occur during the production of a cured polyurethane resin from liquid components. If the ion exchange resin has an active hydrogen ion, the acidic property will be neutralized by the alkaline catalyst, destroying both the urethane foam reaction and the ion exchange property of the resin. It has also been proposed to add finely ground ion exchange beads to a flexible polyurethane foam prior to foaming. It has been reported, however, that the presence of the ion exchange bead in the foaming system adversely affected the foaming reaction and the physical properties of the cured foam.

It is an object of the present invention to produce an ion exchange resin which overcomes or alleviates one or more of the difficulties associated with the prior art.

According to the present invention there is provided an ion exchange resin comprising a polymer containing ion exchanging sites which is dispersed or distributed throughout a polyurethane matrix wherein said ion exchanging sites are introduced subsequent to the formation of said polyurethane matrix.

The term "ion exchange resin" when used herein includes any polymeric material capable of removing anions and/or cations from solution by sorption irrespective of the mechanism.

The term "dispersed or distributed" when used herein includes a dispersion of discrete particles as well as networks of polymers which are intimately mixed throughout or incorporated within the polyurethane matrix such in interpenetrating polymer systems.

The ion exchange resin comprises a urethane polymer as a matrix or continuous phase. The ion exchange material typically takes the form of a modified second polymer dispersed or distributed throughout the polyurethane matrix. The ion exchanging sites are introduced subsequent to the formation of the polyurethane matrix. This may be done in a number of different ways. A polymer having no ion exchanging sites may be introduced into urethane raw materials, a polyurethane polymerisation reaction may then be conducted to form a polyurethane matrix having the polymer dispersed or distributed therein. The introduced polymer may then be chemically modified to provide ion exchanging sites. In an alternative embodiment, a polyurethane foam may be interpenetrated with one or more monomers, at least one of which has one or more ion exchanging ligands attached. The one or more monomers may then be polymerised to provide a polymer containing ion exchanging sites. In yet another embodiment, a polyurethane matrix may be provided, the matrix may be interpenetrated with one or more monomers none of which have ion exchange ligands attached. The monomers may be polymerised to provide a polymer and the polymer may then be chemically modified to provide ion exchanging sites. In each of these embodiments, the ion exchanging sites are introduced subsequent to the formation of the polyurethane matrix, thereby overcoming the problems associated with the prior art.

Polyurethane formulation and manufacture in many forms is well known. Polyurethane resins can be produced in a range of shapes and forms for example beads including microcontroller beads and expanded beads, foams including elastomeric foams, films, fibres and membranes.

Therefore the ion exchange resin of the present invention can be produced in a form best suited to a particular application or process. For example, larger particles of open cell polyurethane having a suitable ion exchange material dispersed therein, when incorporated into a resin-in-pulp based metals recovery process can easily be removed from the pulp by screening. Standard ion exchange resins are difficult to separate from pulps by simple screening procedures. Polyurethanes particularly those based on polyether polyols have the further advantage that they exhibit excellent resistance to both acidic and alkaline solutions, have good abrasion resistance and good flexibility over a wide range of temperatures and may be formulated to obtain a controlled degree of hydrophilicity.

the dispersed or distributed phase polymer typically may be a polymer formed from monomers of styrene, acrylonitrile, vinyl chloride, vinylidene chloride, divinyl benzene, butadiene, epichlorohydrin, caprolactone, thiodiglycol, thiodianiline, diallylamine, methylacrylonitrile, hydrazides, dicyclopentadiene, vinyl butyral, succinic anhydride, allyl halides, allyl malonic acid, acryloyl chloride, polyacetal, vinyl alcohol, aminosalicylic acid, dimethylolpropionic acid, α-methyl styrene, p-methyl styrene, acrylates such as methylmethacrylatek, acrylamide, methylacrylamide, acrylic acid, hydroxyethyl acrylate, hydroxypropyl acrylate, glycidyl methacrylate, ethylene dimethacrylate, methylacrylic acid, hydroxyethyl methacrylate, ethylene glycol dimethacrylate, ethyl acrylate, acrylimido salicylic acid, acrylimido diacetic acid, acrylimido malonic acid, acrylimido phthalic acid, acrylimido glycolic acid, or combinations of these monomers or chemical modifications of these monomers but is not limited to these monomers. Such chemical modification may be, for example, chlorination, hydroxylation, sulphonation, nitration, amination and the like. Examples are hydroxy styrene, vinylbenzyl chloride, hydroxyethyl styrene, α-methyl styrene, p-methyl styrene, dihydroxyethyl styrene, styrene sulphonic acid, acetoxy styrene.

Typical polymers which may form the dispersed phase include polystyrene, styrene-divinyl benzene, styrene-acrylonitrile, styrene-acrylonitrile-methylmethacrylate, acrylonitrile-methylmethacrylate, polyacrylonitrile, polyacrylates, acrylic or methacrylic esters, acrylonitrile-unsaturated dicarboxylic acid-styrene, vinylidene chloride-acrylonitrile, epoxy(glycidyl methacrylate)-acrylonitrile, poly p-methylstyrene, polyureas, aniline-phenol-formaldehyde, phenol-formaldehyde, styrene-butadiene, styrene-acrylonitrile-butadiene, acrylonitrile-polyethylene glycol, polyamides, polyacrylamides, polyimidazoles, allylglycidyl ether adducts of diamines, ethylene and propylene carbonate adducts of diamines, polybutadiene-acrylates, polydiallylamine, epoxy adducts, polycaprolactone, caprolactone-acrylates, polydicyclopentadiene, sytrene-methacrylonitrile, methacrylonitrile-divinylbenzene, polyvinyl chloride, glycidyl methacrylate-ethylene dimethacrylate, acrylonitrile-methylacrylic acid, polyvinyl alcohol-acrylonitrile, methyl methacrylate-hydroxyethyl acrylate, hydroxyethyl methacrylate-oligo(ethylene glycol)dimethacrylate, hydroxystyrene-methylmethacrylate, polyethyl acrylate-polystyrene, crosslinked butadiene, polystyrene-polyethyleneimine, polystyrene-arsenazo, epoxy-polystyrene, epoxy-diaza crown ethers, polyacetal, cresol sulphonic acid-phenol-formaldehyde, anthraquinone-formaldehyde, acryloyl chloride-iminodiacetic acid, acryloyl chloride-aminosalicylic acid, acryloyl chloride-methyl nitrophenol-triethylamine, methyl nitrophenol-acetic anhydride-acrylic acid, hydroxy acetophenone-substituted benzoic acid-formaldehyde, or, other like polymers or combination of polymers.

The chemical modification may also modify the polyurethane matrix. For example ligands may be attached to the urea groups, reactive methyl groups, or to the aromatic ring of the isocyanate component of the polyurethane matrix if an aromatic isocyanate is used in the production of the polyurethane resin. Additionally, reactive sites may be incorporated into the polyurethane by modifying an isocyanate with a material containing reactive sites (such as a dihydroxy compound) to form a prepolymer and further reacting the prepolymer with additional materials to produce the desired polyurethane.

In the embodiments where dispersed or distributed phase polymer is chemically modified after it is dispersed or distributed throughout the polyurethane matrix it is chemically modified by methods known in the art. For example, by chloromethylation, sulphonation, carboxylation, amination, phosphorylation, thioureation, diazotization, amidoximation, oximation, etc. or other processes to attach specific ligands to the dispersed phase polymer to provide the ion exchange resin with the desired ion exchange properties. The chemical modification of the dispersed phase polymer may take place in one or more steps. For example, the dispersed phase polymer may be modified by halomethylation, sulphonation, amination, carboxylation or other applicable modification. A further modification of the ion exchange resin so produced, may be achieved by chemical reaction to attach particular ligands to the halomethyl, sulphonic acid, amine, amide, carboxylic acid or other site. This further reaction may be, for example, amination, phosphorylation, thioureation, diazotization etc.

The desired chemical reaction generally occurs by an appropriate choice of the dispersed phase polymer and chemical conditions suitable to attach the required ligand. For example, phosphonate esters, phosphinic acid ligands etc. may be incorporated by chloromethylating a polyurethane interpenetrating polymer system containing polystyrene styrene-divinyl benzene and then further reacting the chloromethylated polystyrene with phosphorus trichloride, phosphorus oxychloride, etc. in the presence of a Friedel-Crafts catalyst such as aluminium trichloride. This reaction is normally conducted at temperatures ranging from 0° C. to 75° C. Or, the phosphonate esters, phosphinic acid ligands etc. may be incorporated by reacting the benzene rings present in the polyurethane and/or which have been provided by the interpenetration of the polyurethane with the polystyrene-divinyl benzene with phosphorus trichloride, phosphorus oxychloride, etc. in the presence of a Friedel-Crafts catalyst such as aluminium trichloride. This reaction is normally conducted at temperature ranging from 0° C. to 75° C. Alternatively, a polyurethane interpenetrating polymer system containing p-methylstyrene may be chloromethylated using sodium hypochlorite and a catalyst such as benzyltriethylammonium chloride at room temperature under an argon atmosphere. The chloromethylated groups may then be further reacted to add ligands such as sulphonic, carboxylic, phosphoric acid etc. To assist the reaction, the polyurethane interpenetrating polymer system may be swollen in a solvent such as toluene. Other reactions can be similarly conducted. This technology is not limited in its scope to the examples given.

According to a further embodiment of the present invention there is provided a method of producing an ion exchange resin comprising:
  providing a polyurethane interpenetrating polymer system which comprises a polyurethane polymer having a second polymer dispersed or distributed therein; and
  chemically modifying said second polymer to provide ion exchanging sites.

According to another embodiment of the present invention there is provided a method of producing an ion exchange resin comprising:

providing a polyurethane matrix;
interpenetrating said matrix with one or more monomers, at least one of which has one or more ion exchanging ligands attached; and
polymerising said one or more monomers to provide said polymer containing ion exchanging sites.

The chemical modification may also modify the polyurethane matrix. For example ligands may be attached to the aromatic ring of the isocyanate component of the polyurethane matrix if an aromatic isocyanate is used in the production of the polyurethane resin.

The ion exchange resins of the present invention may be produced from known polyurethane interpenetrating polymer systems. Therefore, according to a further embodiment of the present invention there is provided a method of producing an ion exchange resin comprising:

providing a polyurethane interpenetrating polymer system which comprises a polyurethane polymer having a second polymer dispersed or distributed therein; and
chemically modifying said second polymer to provide ion exchanging sites.

Polyurethane interpenetrating polymer systems can be formed by sequential polymerisation, latex blending and simultaneous blending. They are typically intimate mixtures of two or more cross-linked polymer networks held together by permanent topological entanglements (catenation). Typically polyurethane interpenetrating polymer systems are produced from two or more different monomers or low molecular weight prepolymers and cross-linking agents of the component polymers. These are then polymerised/cross-linked simultaneously via non-interfering reaction mechanisms. By this procedure, elastomeric polyurethane polymers are typically produced as a continuous phase containing micron and submicron sized beads of a second and different polymer as a dispersed phase. The polyurethane phase may be linear or cross-linked.

Interpenetrating polyurethane polymers can be produced in which the dispersed phase may be for example polystyrene, poly(methyl methacrylate), acrylic acid-styrene copolymer, acrylic copolymer or vinyl chloride copolymer, or other monomers or copolymers. A polyurethane is impregnated with one or more monomers in the presence of suitable catalysts and the matrix so obtained is subsequently cured.

The above polyurethane interpenetrating polymer systems may be chemically modified as described above to obtain desired ion exchange properties.

According to yet another embodiment of the present invention there is provided a method of producing an ion exchange resin comprising:

a polymer having no ion exchange sites into urethane raw materials;
conducting a polyurethane polymerisation reaction to form a polyurethane matrix having said polymer dispersed or distributed therein; and
chemically modifying said polymer to provide said ion exchanging sites.

For example a polyol having a second polymer dispersed therein may be reacted with a diisocyanate or a blend of diisocyanates to produce a polyurethane having a second polymer dispersed therein. The second polymer may then be chemically modified to obtain ion exchanging sites.

Polymer/copolymer polyols are known in which a monomer, or a blend of monomers has been polymerised in the polyol to produce a polyol having a second polymer dispersed therein. For example a polyol is known which is based on glycerine which has been reacted with propylene oxide or a combination of etheylene oxide and propylene oxide to produce a polyether triol with a molecular weight generally in excess of 3000. Styrene and acrylonitrile monomers are then polyermised within this polymer to produce a polymer/copolymer polyol. Other polyols used in the production of elastomeric polyurethane may also be used as may other monomer combinations. This polymerisation process generally produces microscopic beads dispersed throughout the polyol raw material.

the polyurethane is produced by the reaction of the above polymer/copolymer polyol with a diisocyanate or a blend of diisocyanates. The polymer/copolymer polyol may be blended with other hydroxyl-containing polyols. The reaction may occur in the presence of catalysts, surfactants, plasticizers, fire retardants, fillers, etc. and water if a foamed material is desired. A polyurethane, is formed, having a second polymer dispersed or distributed throughout the continuous phase. The second polymer is capable of being chemically modified.

Typical polymers which may form the dispersed phase are as described above. The chemical modification to produce the desired ion exchange properties are as described above.

In still another embodiment of the present invention, there is provided a method of producing an ion exchange resin comprising:

providing an ion exchange resin as described above; and
chemically modifying said resin to modify the ion exchange properties.

Modification of the ion exchange process may be further achieved by the incorporation of melamine, melamine-formaldehyde or solvent extractants containing phosphorus, or nitrogen or sulphur or any combination of these into the interpenetrating polymer. In the case of melamine this may be achieved by the incorporation of melamine in particulate form, or sufficiently reacted with formaldehyde, paraformaldehyde, etc. under alkaline conditions to render the dispersed phase melamine-formaldehyde polymer water insoluble. Incorporation of melamine or melamine formaldehyde and phosphorus-containing additives are used in foam production to provide fire retardancy to the cured polymer. The incorporation of these additives or other phosphorus based additives such as tributyl phosphate or nitrogen containing additives such as trioctyl amine into the ion exchange resin of the present invention may act in a synergistic fashion with other ion exchange ligands.

The incorporation of melamine could also provide additional sites for chemical modification.

Additionally, other extractants such as water insoluble solvent extractants may be incorporated into the polyurethane prior to, or subsequent to, curing to further modify the ion exchange or chelating properties of the ion exchange resin of the present invention.

Polyurethanes with controlled levels of urea groups present can also be obtained. The urea groups may be reacted such as with carbon disulfide or other similar sulphur-containing reagents (eg. $H_2S$) to further modify the properties of the ion exchange resins.

If it is considered desirable that the polyurethane matrix exhibit hydrophilic properties, this may be accomplished by known procedures. For instance, if part or all of the propylene oxide is replaced by ethylene oxide during production of the polyol raw material, the polyol so produced will make the polyurethane more hydrophilic. The position of the ethylene oxide units can further modify the metal ion sorption properties of the polyurethane. The combination of the position and percentage of the ethylene oxide units when combined with particular catalyst systems can improve both the chemical resistance and metal sorption properties of the polyurethane, as illustrated in Example 2. The inclusion of polyethylene glycol in the polyurethane formulation during manufacture will also enhance the hydrophilic properties of the final product.

A further advantage of the ion exchange resins of the present invention is that the majority of the reactive ligands will be located close to or at the surface of the dispersed phase polymer thereby enabling favourable ion exchange kinetics to be achieved.

The polymeric ion exchange resins of the present invention may find application in waste water treatment and in the recovery of metal values from solution in hydrometallurgical processes. They offer a number of significant advantages over existing ion exchange beads, particularly the ease of producing the polyurethane in a wide variety of forms and shapes, which both enhances their subsequent recovery or removal from process streams and extends the scope of industrial application. The combination of desirable physical and chemical properties, and in particular, their excellent abrasion resistance and good flexibility improves their mechanical performance; the micron or submicron sized ion exchange particles contained in the polyurethane matrix or the ligands attached to the polyurethane matrix provide a rapid uptake of ions from solution.

Therefore according to a further embodiment of the present invention there is provided a method for recovering soluble electrolytes in a hydrometallurgical process including:

contacting an ion exchange resin as hereinbefore described with a solution containing a suspension of ore solids; and recovering the ion exchange resin.

Ions such as gold, zinc, copper, chromium, palladium, platinum, silver, cobalt, mercury, arsenic, molybdenum and mixtures thereof may be recovered. The person skilled in the art will of course recognise that many other ions may be recovered using the process described above.

The ion exchange resin may be in the form of granules which may be recovered by screening or the ion exchange resin may contain a magnetic material and the ion exchange resin may be recovered by magnetic separation.

The present invention also provides a method of recovering soluble electrolytes from waste water comprising:

contacting an ion exchange resin as described above with said waste water; and recovering the electrolytes from the ion exchange resin.

The waste water may be for example an industrial effluent or sewage effluent and any desired metal ions may be recovered. The process of the present invention may therefore be used to treat effluents to remove toxic metals to meet the requirements of environmental regulations. The metal ions and/or the effluent may be subsequently recycled.

The present invention will now be more fully described with reference to the accompanying examples. It should be understood, however, that the descriptions following are illustrative only and should not be taken in any way as a restriction on the generally of the invention described above.

EXAMPLE 1

Examples based on Incorporation of Ligands Directly on to the Polyurethane Polymer A polyurethane foam was produced by blending a 3800 MW polyol with the desired quantity of water to achieve the required degree of expansion, together with silicone surfactants, and catalysts, then reacting this mixture with the requisite quantity of toluene diisocyanate to produce a polyurethane foam. The polyol selected was based on glycerine and contained approximately 13% of poly(ethylene oxide) (as measured by NMR) in a block of ethylene oxide units, the remainder being poly(propylene oxide) units.

EXAMPLE 1A

Amination 1 gram of the polyurethane was reacted with 0.4 grams of dimethylamino-1-chloroethane together with 80 ml 1M sodium hydroxide. The reaction was conducted at 80° C. for 4 hours. The polyurethane was washed in water until neutral and vacuum dried at 60° C.

0.1 gram of the treated polyurethane foam was contacted for 2 hours with 20 ml of a 50 ppm chromium(VI) solution at a pH value of 2.0. The treated polyurethane sorbed 60% of chromium(VI), whereas the untreated polyurethane only sorbed 11% of chromium(VI) under the same conditions.

EXAMPLE 1B

Phosphorylation 1 gram of polyurethane was placed in 70 ml of toluene then reacted at room temperature for four hours with 2.5 ml of phosphorus oxychloride in 10 ml of pyridine. The foam was then washed in water, 1M hydrochloric acid, and again in water until neutral, then vacuum dried at 60° C.

0.1 gram of the treated polyurethane was contacted with 20 ml of a solution containing 50 ppm copper(II) plus 50 ppm of zinc(II) plus 50 ppm of cobalt(II) for 2 hours. The treated polyurethane removed 87% of the copper(II), 66% of the zinc(II) and 56% of the cobalt(II) from an aqueous solution at a pH of 5.0, whereas the untreated foam did not indicate any observable removal of metal ions under the same conditions.

EXAMPLE 1C

Carboxylation 1 gram of the polyurethane was treated with 1 gram of monochloroacetic acid in a 1M solution of sodium hydroxide at 80° C. for 15 hours. The polyurethane was washed in water until neutral and vacuum dried at 60° C.

0.1 gram of the treated polyurethane foam was contacted with 20 ml of the solution containing 50 ppm copper(II) plus 50 ppm of zinc(II) plus 50 ppm of cobalt(II) for 2 hours. The treated polyurethane selectively removed 13% of copper(II) from the mixed solution at a pH value of 5.0, whereas the untreated foam failed to remove copper from solution.

EXAMPLE 1D

Chlorination 1 gram of the polyurethane foam was placed in 80 ml of 1.2 dichloroethane and then treated at 60° C. for 16 hours with 5 ml of 125 g/l sodium hypochlorite solution in the presence of benzyl trimethylammonium chloride as a catalyst. The foam was washed in water until neutral and dried in an oven. Chemical reaction was confirmed by NMR spectroscopy which indicated a loss in the N-H signal. The polyurethane exhibited improved chemical and solvent resistance.

EXAMPLE 2

Effect of Formulation and Catalyst on the Chemical Resistance and Sorption Properties of a Polyurethane Polyurethane foams were produced from a blend of a 5000 MW polyol containing a high content of poly(ethylene oxide) units with a 4800 MW poly(ethylene oxide) capped polyol under different catalyst regimes. The polyols were both based on glycerine, one containing approximately 75% of poly(ethylene oxide) units and the other, 15% of poly(ethylene oxide) units as a capping (ethylene oxide content was determined by NMR), thus many of the terminal units consist of primary hydroxyls thus providing the polyol with self-catalysing properties. The formulations contained similar levels of water, silicone surfactant, and toluene diisocyanate. One foam was produced with stannous octoate as a catalyst, the other foam did not contain this catalyst.

The polyurethane containing the stannous octoate catalyst was observed to have a significantly improved chemical resistance and was used in the following examples:

EXAMPLE 2A

The polyurethane described above and containing stannous octoate as a catalyst was observed to have a significant improvement in chemical and solvent resistance to the polyurethane produced without this catalyst. For example, it resisted attack by dimethyl sulphoxide and by methyl sulphonic acid, whereas the other polyurethane was rapidly swollen by these solvents and dissolved in them. Mössbauer spectroscopy indicated that potassium ferricyanide when loaded on to this polyurethane produced a paramagnetic relaxation spectrum; whereas, this relaxation was not observed with the polyurethane produced without the stannous octoate catalyst.

EXAMPLE 2B

Thioamidation 1 gram of the above polyurethane containing the stannous octoate catalyst was reacted at 50° C. for 2 hours with 10 ml of formaldehyde in 70 ml of water then further treated with 4 ml of carbon disulphide in 80 ml of water at 50° C. for 15 hours. The polyurethane was thoroughly washed in water then soaked for 30 minutes in 1M NaOH, then again washed with water until neutral and vacuum dried at 60° C.

0.1 gram of the treated polyurethane was contacted with 20 ml of a solution containing 50 ppm copper(II) plus 50 ppm of zinc(II) plus 50 ppm of cobalt(II) for 2 hours. The treated polyurethane selectively removed 8% of the copper (II) from an aqueous solution at a pH of 5.0, whereas the untreated foam did not indicate any observable removal of metal ions under the same conditions.

EXAMPLE 3

Examples based on Incorporation of Interpenetrating Polymer into Polyol Prior to Production of Polyurethane The following examples are based on a polyol which contains a dispersion of 40% of a polystyrene-acrylonitrile copolymer in a 4800 MW glycerine based poly(ethylene oxide), poly(propylene oxide)polyol. To this polyol was added water, silicone surfactants, and catalysts and the mixture was then reacted with the requisite quantity of toluene diisocyanate to produce an expanded copolymer-containing polyurethane foam.

EXAMPLE 3A

Amination 1 gram of the copolymer-containing polyurethane foam was reacted at 90° C. for six hours with 0.1 g diethylenetriamine in 80 ml of toluene and in the presence of rubeanic acid as a catalyst. The polyurethane was washed in water until neutral and vacuum dried at 60° C.

0.1 gram of the modified polymer was contacted for 2 hours with 20 ml of a 50 ppm chromium(VI) at a pH value of 2.0. The treated polyurethane sorbed 62% of chromium (VI), whereas the untreated polyurethane only sorbed 6% of chromium(VI) under the same conditions.

0.1 gram of the modified polymer was contacted for 2 hours with 20 ml of a 50 ppm palladium(II) solution at a pH value of 2.0. The treated polyurethane sorbed 33% of palladium(II), whereas the untreated polyurethane only sorbed 15% of palladium(II) under the same conditions.

0.1 gram of the modified polymer was contacted for 2 hours with 20 ml of a 50 ppm platinum(II) solution at a pH value of 2.0. The treated polyurethane sorbed 73% of platinum(II), whereas the untreated polyurethane sorbed 31% of platinum(II) under the same conditions.

EXAMPLE 3B

Thioamidation 1 gram of the copolymer-containing polyurethane foam was swollen in 70 ml of 1,2-dichloroethane together with benzyl trimethylammonium chloride as a catalyst and treated with 6 grams of sodium sulphide dissolved in 20 ml of water. Sufficient 0.5M sulphuric acid was slowly added over a period of two hours to the reaction mixture to maintain a slightly acidic condition. The polyurethane was then washed in water until neutral and vacuum dried at 60° C.

Prior to treatment the polyurethane failed to remove copper, zinc, and cobalt from solution; however, when the treated polyurethane was contacted with 20 ml of a solution containing 50 ppm copper(II) plus 50 ppm of zinc(II) plus 50 ppm of cobalt(II) for 2 hours 15% of the copper(II), 6% of the zinc(II) and 8% of the cobalt(II) were removed from the mixed aqueous solution at a pH of 5.0.

EXAMPLE 3C

Amidoximation (a) 1 gram of the copolymer-containing polyurethane foam was treated with 100 ml of a 3% aqueous solution of hydroxylamine at 80° C. for 24 hours.

(b) Alternatively, 1 gram of the copolymer-containing polyurethane foam was treated with 2 grams of hydroxylamine plus 10 ml of pyridine in 70 ml of ethanol at 70° C. for 8 hours.

(c) In a further alternative reaction, 1 gram of copolymer-containing polyurethane foam was reacted at 80° C. for 4 hours with 20 ml of a 6% hydroxylamine solution in 60 ml of toluene with benzyl trimethylammonium chloride as a catalyst.

(d) A further alternative reaction, 1 gram of copolymer-containing polyurethane foam was reacted at 80° C. for 24 hours with 80 ml of a 3% methanolic hydroxylamine solution in a pressure vessel.

Each of the foams described above was washed with water, then soaked for 30 minutes in 1M hydrochloride acid, then further washed with water until neutral and vacuum dried at 60° C.

0.1 gram of each of the above modified polymers was contacted for 2 hours with 20 ml of a 50 ppm chromium(VI) solution at a pH value of 2.0. The treated polyurethane in (a) sorbed 16% of chromium(VI), 15% of chromium(VI) for (b), 19% of chromium(VI) for (c), and 85% of chromium (VI) for (d) whereas the untreated polyurethane only sorbed 6% of chromium(VI) under the same conditions.

EXAMPLE 3D

Phosphorylation 1 g of a copolymer-containing polyurethane foam was reacted for 4 hours at 20° C. in 80 ml of 1,2 dichloroethane with 1 g of phosphorus trichloride in the presence of 1 g of aluminum trichloride as a catalyst. The resultant polymer was washed in 95% ethanol, 50% aqueous ethanol, distilled water, 1 N NaOH solution, distilled water, 1N NCl solution and finally with distilled water until free of unreacted reagents. The polymer was then vacuum dried at 60° C.

0.1 gram of the above foam removed 17% of mercuric chloride from an aqueous solution. 0.1 gram of the above foam completely removed 100 ppm of gold cyanide from aqueous solution.

Alternatively, 1 gram of the copolymer-containing polyurethane foam was placed in 70 ml of toluene then reacted at room temperature for four hours with 2.5 ml of phosphorus oxychloride in 10 ml of pyridine. The foam was then washed in water, 1M hydrochloric acid, and again in water until neutral, then vacuum dried at 60° C.

0.1 gram of the treated polymer was contacted with 20 ml of a solution containing 50 ppm copper(II) plus 50 ppm of zinc(II) plus 50 ppm of cobalt(II) for 2 hours. The treated polymer removed 44% of the copper(II), 24% of the zinc(II) and 19% of the cobalt(II) from an aqueous solution at a pH of 5.0, whereas the untreated polymer did not indicate any observable removal of these metal ions under the same conditions.

EXAMPLE 3E

Chloromethylation 1 gram of the copolymer-containing polyurethane foam was swollen in 80 ml of chloroform then reacted at room temperature for 2 hours with 5 grams of octyl chloromethyl ether in 20 ml of chloroform together with stannic tetrachloride as a catalyst. (Octyl chloromethyl ether solution was produced by reacting 15 grams of octanol with 3 grams of paraformaldehyde in 100 ml of chloroform through which dry hydrochloric gas was bubbled. The reaction was conducted for 2 hours.)

(a) Amination

The chloromethylated polymer foam was then aminated by reacting 1 gram of it with 0.1 gram of diethylenetriamine in 80 ml of toluene at 75° C. for four hours.

0.1 gram of the modified polymer was contacted for 2 hours with 20 ml of a 50 ppm chromium(VI) solution at a pH value of 2.0. The treated polymer sorbed 57% of chromium (VI), whereas the untreated polymer only sorbed 6% of chromium(VI) under the same conditions.

0.1 gram of the treated polymer was contacted with 20 ml of a solution containing 50 ppm copper(II) plus 50 ppm of zinc(II) plus 50 ppm of cobalt(II) for 2 hours. The treated polymer selectively removed 18% of the copper(II) from the mixed aqueous solution at a pH of 5.0, whereas the untreated polymer foam did not indicate any observable removal of metal ions under the same conditions.

(b) Phosphorylation 1 gram of the aminated polymer described in (a) above was then placed in 10 ml of toluene and further reacted at room temperature for 4 hours with 2.5 grams of phosphorus oxychloride in 10 ml of pyridine.

The polymer was washed with water, then 1 M hydrochloric acid and again with water until neutral. The polymer was then vacuum dried at 60° C.

The chloromethylated polymer which had been aminated, and then further phosphorylated was evaluated for the removal of copper, zinc and cobalt from aqueous solution at a pH value of 5.0 as follows:

0.1 gram of the treated polymer was contacted with 20 ml of a solution containing 50 ppm copper(II) plus 50 ppm of zinc(II) plus 50 ppm of cobalt(II) for 2 hours. The treated polymer removed 57% of the copper(II), 32% of the zinc(II) and 23% of the cobalt(II) from an aqueous solution, whereas the untreated polymer did not indicate any observable removal of metal ions under the same conditions.

It should be noted that this method of phosphorylation gave an approximate increase in metal ion removal of 50% over the phosphorylated copolymer-containing polyurethane reported in Example 3D above.

Phosphorylation of the aminated site was confirmed by a substantial reduction in sorption of chromium(VI) from solution. 0.1 gram of this phosphorylated polymer was contacted for 2 hours with 20 ml of a 50 ppm chromium(VI) solution at a pH value of 2.0. The phosphorylated polymer sorbed 11% of chromium(VI), whereas the aminated polymer as described in (a) above sorbed 57% of chromium(VI) under the same conditions.

(c) Thioureation/Isothiouronium Resins 1 gram of the chloromethylated polymer was added to a solution of thiourea in water at 85° C. for 6 hours. After the reaction reached completion the resin was rinsed in distilled water, 1N HCl, distilled water, then in acetone and dried.

The resulting resin was used to recover gold and platinum group metals from aqueous solutions.

EXAMPLE 4

Examples Based on Incorporation of Interpenetrating Polymer after Production of Polyurethane Polyurethane foams were produced from a blend of a 5000 MW polyol containing a high content of poly(ethylene oxide) units with a 4800 MW poly(ethylene oxide) capped polyol under different catalyst regimes. The polyols were both based on glycerine, one containing approximately 75% of poly(ethylene oxide) units and the other, 15% of poly (ethylene oxide) units as a capping (ethylene oxide content was determined by NMR), thus many of the terminal units consist of primary hydroxyls thus providing the polyol with self-catalysing properties. To the polyol was added in appropriate quantities, water, silicone surfactant, and stannous octoate as a catalyst. The mixture was then reacted with the required quantity of toluene diisocyanate to produce a foam.

This polyurethane had previously been observed to have a significantly improved chemical and solvent resistance and was used in all of the following examples. Interpenetration was conducted by soaking it in a suitable monomer or blend of monomers which were then polymerised to produce an interpenetrated polyurethane. The following examples are typical of interpenetrated systems which can be produced by this method. Once cured, the interpenetrated polyurethanes were then chemically modified using the techniques previously described (or as given hereunder).

EXAMPLE 4A

Methacrylonitrile (MAN)-Divinylbenzene (DVB)

An appropriate quantity, typically 3 grams, of the polyurethane previously describes was soaked for one hour in the following mixture:

20 grams of MAN plus 6 grams of DVB plus 0.02 grams of potassium persulphate as a polymerisation initiator.

After soaking the polyurethane in this mixture it was transferred to an aqueous solution containing a suitable surfactant plus isooctylmercaptopropionate as a catalyst. Curing was conducted at 90° C. for 15 hours. The interpenetrated polyurethane was washed with water and oven dried. This material is now a precursor for further chemical modification.

(a) Amination 1 gram of the above interpenetrated polyurethane foam was reacted for six hours at 90° C. in 80 ml of toluene with 0.1 g of diethylenetriamine in the presence of rubeanic acid as a catalyst. The foam was washed in water until neutral, then vacuum dried at 60° C.

0.1 gram of the modified polymer was contacted for 2 hours with 20 ml of a 50 ppm chromium(VI) solution at a pH value of 2.0. The treated polymer sorbed 47% of chromium (VI), whereas the untreated material only sorbed 25% of chromium(VI) under the same conditions.

EXAMPLE 4B

Acrylic Acid (AA)-Acrylamide (AM)

(a) Three grams of the polyurethane previously described was soaked for one hour in the following mixture:

20 grams of AA plus 10 grams of AM plus 0.02 grams of potassium persulphate as a polymerisation initiator.

After soaking the polyurethane in this mixture, the polymer was transferred to an aqueous solution containing isooctylmercaptopropionate as a catalyst. Curing was conducted at 90° C. for 15 hours. The interpenetrated polyurethane was washed in water and oven dried.

(b) Alternatively, the polyurethane previously described was soaked for one hour in the following mixture:

5 grams of AA plus 10 grams of AM dissolved in 15 grams of cyclohexane and containing 0.02 grams of potassium persulphate as a polymerisation initiator.

After soaking the polyurethane in this mixture, the polymer was transferred to an aqueous solution containing isooctylmercaptopropionate as a catalyst. Curing was conducted at 90° C. for 15 hours. The interpenetrated polyurethane was washed in water and oven dried.

0.1 gram of each of the treated polyurethanes was separately contacted with 20 ml of a solution containing 50 ppm copper(II) plus 50 ppm of zinc(II) plus 50 ppm of cobalt(II) for 2 hours. The treated polyurethanes selectively removed 26% of copper(II) for (a) and 32% of copper(II) for (b), from the mixed aqueous solution, whereas the untreated foam did not indicate any observable removal of metal ions under the same conditions.

It was observed that the change in the ratio of AA to AM also gave a substantial change in the uptake of chromium (VI) at a pH value of 2.0.

0.1 gram of the treated polyurethane was contacted for 2 hours with 20 ml of a 50 ppm chromium(VI) solution at a pH value of 2.0. The treated polyurethane sorbed 34% of chromium(VI), whereas the untreated polyurethane sorbed 25% of chromium(VI) under the same conditions.

EXAMPLE 4C

Polystyrene-Divinyl Benzene

Three grams of the polyurethane previously described was soaked for one hour in the following mixture:

30 grams of styrene monomer plus 5 grams of divinyl benzene (DVB) plus 0.02 grams of potassium persulphate as a polymerisation initiator.

After soaking the polyurethane in this mixture, the polymer was transferred to an aqueous solution containing a suitable surfactant plus isooctylmercaptopropionate as a catalyst. Curing was conducted at 80° C. for 15 hours. The interpenetrated polyurethane was washed in water and oven dried.

Chloromethylation (a) Chloromethylation of 1 gram of a polyurethane containing polymerised p-methylstyrene was accomplished using aqueous sodium hypochlorite. Benzyltriethylammonium chloride was used as the catalyst. The reaction was conducted at room temperature for 16 hours in 80 ml of 1,2-dichloroethane under an argon atmosphere.

(b) 1 gram of the polystyrene divinylbenzene interpenetrated polyurethane foam described above was swollen in 70 ml of chloroform and reacted at room temperature for 2 hours with 5 grams of octyl chloromethyl ether solution together with stannic tetrachloride. (Octyl chloromethyl ether was produced by reacting 13 grams of octanol plus 3 grams of paraformaldehyde in 100 ml of chloroform through which dry hydrochloric gas was bubbled. The reaction was conducted for 2 hours.)

Amination

The chloromethylated polymer as given in (b) above was then aminated by reacting 1 gram of it at 75° C. for four hours with 0.1 gram of diethylenetriamine in 80 ml of toluene. The polymer was washed with water until neutral and vacuum dried at 60° C.

0.1 gram of this polymer was contacted for 2 hours with 20 ml of a 50 ppm chromium(VI) solution at a pH value of 2.0. The treated polymer sorbed 40% of chromium(VI), whereas the untreated polymer sorbed 25% of chromium (VI) under the same conditions.

Phosphorylation

The chloromethylated polymer as given in (b) above, was phosphorylated as follows:

1 gram of the chloromethylated polymer was placed in 80 ml of 1,2 -dichloromethane together with 1.6 grams of phosphorus trichloride and aluminium chloride as a catalyst. The phosphorylated polymer was washed in water until neutral and vacuum dried at 60° C.

0.1 gram of the treated polymer was contacted with 20 ml of a solution containing 50 ppm copper(II) plus 50 ppm of zinc(II) plus 50 ppm of cobalt(II) for 2 hours. The treated polymer selectively removed 12% of copper(II) from the mixed aqueous solution, whereas the untreated foam did not indicate any observable removal of metal ions under the same conditions.

EXAMPLE 4D

Polystyrene-Methacrylonitrile

Three grams of the polyurethane previously described was soaked for one hour in the following mixture:

30 grams of styrene monomer plus 20 grams of methacrylonitrile (MAN) plus 0.002 grams of potassium persulphate as a polymerisation initiator.

After soaking the polyurethane in this mixture, the polymer was transferred to an aqueous solution containing a suitable surfactant plus isooctylmercaptopropionate as a catalyst. Curing was conducted at 80° C. for 15 hours. The interpenetrated polyurethane was washed in water and oven dried. Changes in the physical properties of the final cured polymer indicated that the interpenetration had been successfully conducted.

Those skilled in the art will appreciate that the invention described herein is susceptible to variations and modifications other than those specifically described. It is to be understood that the invention includes all such variations and modifications which fall within its spirit and scope.

What is claimed is:

1. An ion exchange resin comprising a polymer that contains ion exchanging sites, wherein said polymer is dispersed or distributed throughout a continuous phase polyurethane matrix, to form an interpenetrating polymer system, and wherein said ion exchanging sites are introduced subsequent to the formation of said polyurethane matrix, so as to maintain the physical and chemical properties of said polyurethane matrix, whereby the majority of said ion exchanging sites are located close to or at the surface of said polymer.

2. An ion exchange resin according to claim 1 which is formed by introducing a polymer having no ion exchanging sites into urethane raw materials; conducting a polyurethane polymerisation reaction to form a polyurethane matrix having said polymer dispersed or distributed therein; and chemically modifying said polymer to provide said ion exchanging sites.

3. An ion exchanging resin according to claim 1 which is formed by providing a polyurethane matrix; interpenetrating said matrix with one or more monomers, at least one of which has one or more ion exchanging ligands attached; and polymerising said one or more monomers to provide said polymer containing ion exchanging sites.

4. An ion exchange resin according to claim 1 which is formed by providing a polyurethane matrix; interpenetrating said polyurethane matrix with one or more monomers none of which have ion exchange ligands attached; polymerising said one or more monomers to provide a polymer; and chemically modifying said polymer to provide said ion exchanging sites.

5. An ion exchange resin according to claim 4, wherein the polymer has been chemically modified by one or more of chloromethylation, sulphonation, carboxylation, amination, phosphorylation, thioureation, diazotization, amidodximation, or oximation in one or more steps to provide said ion exchanging sites.

6. An ion exchange resin according to claim 1 wherein the polymer containing ion exchanging sites is a polymer formed from monomers of styrene, acrylonitrile, vinyl chloride, vinylidene chloride, divinyl benzene, butadiene, epichlorohydrin, caprolactone, thiodiglycol, thiodianiline, diallylamine, methylacrylonitrile, hydrazides, dicyclopentadiene, vinyl butyral, succinic anhydride, allyl halides, allyl malonic acid, acryloyl chloride, polyacetal, vinyl alcohol, aminosalicylic acid, dimethylolpropionic acid, α-methyl styrene, p-methyl styrene, acrylates such as methylmethacrylate, acrylamide, methylacrylamide, acrylic acid, hydroxyethyl acrylate, hydroxypropyl acrylate, glycidyl methacrylate, ethylene dimethacrylate, methylacrylic acid, hydroxyethyl methacrylate, ethylene glycol dimethyacrylate, ethyl acrylate, acrylimido salicylic acid, acrylimido diacetic acid, acrylimido malonic acid, acrylimido phthalic acid, acrylimido glycolic acid, or combinations, or chemical modifications, or both combinations and chemical modifications thereof.

7. An ion exchange resin according to claim 6 wherein the chemically modified monomers are selected from hydroxy styrenes, vinylbenzyl chloride, hydroxyethyl styrene, α-methyl styrene, p-methyl styrene, dihydroxyethyl styrene, styrene sulphonic acid, acetoxy styrene or combinations of these chemically modified monomers.

8. An ion exchange resin according to claim 1 wherein the polymer containing ion exchanging sites is selected from polystyrene, styrene-divinyl benzene, styrene-acrylonitrile, styrene-acrylonitrile-methylmethacrylate, acrylonitrile-methylmethacrylate, polyacrylonitrile, polyacrylates, acrylic or methacrylic esters, acrylonitrile-unsaturated dicarboxylic acid-styrene, vinylidene chloride-acrylonitrile, epoxy)glycidyl methacrylate)-acrylonitrile, poly p-methylstyrene, polyureas, aniline phenolformaldehyde, phenol-formaldehyde, styrene-butadiene, styrene-acrylonitrile-butadiene, acrylonitrile-polyethylene glycol, polyamides, polyacrylamides, polyimidazoles, allylglycidyl ether adducts of diamines, ethylene and propylene carbonate adducts of diamines, polybutadiene acrylates, polydiallylamine, epoxy adducts, polycaprolactone, caprolactone-acrylates, polydicyclopentadiene, styrene-methacrylonitrile, methacrylonitrile-divinylbenzene, polyvinyl chloride, glycidyl methacrylate-ethylene dimethacrylate, acrylonitrile-methylacrylic acid, polyvinyl alcohol-acrylonitrile, methyl methacrylate-hydroxyethyl acrylate, hydroxyethyl methacrylate-oligo(ethylene glycol) dimethacrylate, hydroxystyrene-methylmethacrylate, polyethyl acrylate-polystyrene, crosslinked butadiene, polystyrene-polyethyleneimine, polystyrene-arsenazo, epoxy-polystyrene, epoxy-diaza crown ethers, polyacetal, cresol sulponic acid-phenol-formaldehyde, anthraquinone-formaldehyde, acryloyl chloride-iminodiacetic acid, acryloyl chloride-aminosalicylic acid, acryloyl chloride-methyl nitrophenol-triethylamine, methyl nitrophenol-acetic anhydride-acrylic acid, hydroxy acetophenone-substituted benzoic acid-formaldehyde, or combinations thereof.

9. A ion exchange resin according to claim 1 wherein said polyurethane matrix has been formed from an isocyanate or hydroxy terminated prepolymer.

10. An ion exchange resin according to claim 1 wherein said polyurethane matrix is chemically modified to provide ion exchanging sites.

11. An ion exchange resin according to claim 1 wherein said ion exchanging sties are incorporated into the polyurethane matrix.

12. An ion exchange resin according to claim 2 wherein the polymer has been chemically modified by one or more of chloromethylation, sulphonation, carboxylation, amination, phosphorylation, thioureation, diazotization, amidoximation, or oximation in one or more steps to provide said ion exchanging sites.

13. An ion exchange resin according to claim 1 wherein melamine, melamine formaldehyde or solvent extractants containing phosphorus, or nitrogen or sulphur or any combination of these have been incorporated into the polymer containing ion exchanging sites.

14. A method of producing an ion exchange resin comprising:
   introducing a second polymer having no ion exchanging sites into urethane raw materials;
   conducting a polyurethane polymerisation reaction to form a continuous phase polyurethane matrix having said second polymer dispersed or distributed therein which is an interpenetrating polymer system; and chemically modifying said polymer to provide said ion exchanging sites, said ion exchanging sites being formed subsequent to the formation of said polyurethane matrix.

15. A method according to claim 14 wherein a polyol having a polymer dispersed therein is reacted with a diisocyanate or a blend of diisocyanates to form said polyurethane matrix having said polymer dispersed or distributed therein.

16. A method of producing an ion exchange resin comprising:

providing a polyurethane interpenetrating polymer system which comprises a continuous phase polyurethane polymer having a second polymer dispersed within the polyurethane polymer; and chemically modifying said second polymer to provide ion exchanging sites, said ion exchanging sites being introduced subsequent to the formation of said interpenetrating polymer system.

17. A method of producing an ion exchange resin comprising:

providing a polyurethane matrix; interpenetrating said matrix with one or more monomers, at least one of which has one of more ion exchange ligands attached; and polymerising said one or more monomers to provide said polymer containing ion exchanging sites and form an interpenetrating polymer system.

18. A method of producing an ion exchange resin comprising:

providing an open cell polyurethane foam;

interpenetrating said polyurethane foam with one or more monomers none of which have ion exchange ligands attached;

polymerising said one or more monomers to provide a second polymer dispersed or distributed on the polyurethane foam to form an interpenetrating polymer system; and subsequent to the formation of said second polymer, chemically modifying said second polymer to provide ion exchanging sites.

19. A method according to claim 18 wherein said polyurethane matrix is also chemically modified.

20. A method of producing an ion exchange resin comprising:

providing an ion exchange resin according to claim 1; and chemically modifying said resin to modify the ion exchange properties.

21. A method for removing soluble electrolytes in waste water treatment processes or hydrometallurgical processes, comprising employing an ion exchange resin according to claim 1.

22. A method for removing soluble electrolytes from a solvent comprising:

contacting the solvent with an ion exchange resin according to claim 1; and recovering the electrolytes from the ion exchange resin.

23. A method according to claim 22 wherein the ion exchange resin is mixed with the solvent and subsequently recovered from the solvent prior to recovering the electrolytes from the resin.

24. A method according to claim 22 wherein the solvent is passed through a bed containing the ion exchange resin.

25. A method for recovering soluble electrolytes in a hydrometallurgical process including:

contacting an ion exchange resin according to claim 1 with a solution containing a suspension or ore solids; and recovering the ion exchange resin.

26. A process according to claim 25 wherein the soluble electrolytes are selected from ions of gold, zinc, copper, chromium, palladium, platinum, silver, cobalt, mercury, arsenic, molybdenum and mixtures thereof.

27. A process according to claim 25 wherein the ion exchange resin is in the form of granules.

28. A process according to claim 25 wherein the ion exchange resin is recovered by screening.

29. A process according to claim 25 wherein the ion exchange resin contains a magnetic material and the ion exchange resin is recovered by magnetic separation.

30. A method of recovering soluble electrolytes from waste water comprising:

contacting an ion exchange resin according to claim 1 with said waste water; and recovering the electrolytes from the ion exchange resin.

31. A method according to claim 30 wherein the waste water is an industrial effluent or sewage effluent.

32. A method for treating effluent streams to recover desired metal ions contained therein comprising employing an ion exchange resin according to claim 1.

33. A method for removing toxic metals from a discharge of an effluent, comprising employing an ion exchange resin according to claim 1.

34. A method according to claim 33, wherein at least one of the toxic metal or the effluent is subsequently recycled.

35. A method for extracting or recovering metal ions from a clarified lixiviant, a process solution partly clarified by removal of larger ore solids, or ore solids in the form of a pulp in a hydrometallurgical process comprising employing an ion exchange resin according to claim 1.

* * * * *